US012630409B2

(12) United States Patent
McKee et al.

(10) Patent No.:  US 12,630,409 B2
(45) Date of Patent:  May 19, 2026

(54) APPARATUS FOR PREPARING AND DELIVERING CUSTOM-ORDERED CAFFEINATED BEVERAGES

(71) Applicant: COFU LLC, Richardson, TX (US)

(72) Inventors: Philip R. McKee, Dallas, TX (US);
Lee VanLanen, McKinney, TX (US);
Scott Smith, Richardson, TX (US);
Andrew Podevels, Wauwatosa, WI
(US); Kevin Grogan, Wylie, TX (US);
Anthony Sayas, Wylie, TX (US)

(73) Assignee: Appliance Innovation Inc.,
Richardson, TX (US)

( * ) Notice: Subject to any disclaimer, the term of this
patent is extended or adjusted under 35
U.S.C. 154(b) by 5 days.

(21) Appl. No.: 18/956,040

(22) Filed: Nov. 22, 2024

(65) Prior Publication Data

US 2025/0083942 A1      Mar. 13, 2025

Related U.S. Application Data

(63) Continuation-in-part of application No. 18/105,474,
filed on Feb. 3, 2023.

(51) Int. Cl.
*A47J 31/60*       (2006.01)
*A47J 31/52*       (2006.01)
*B67D 1/07*        (2006.01)
*B67D 1/08*        (2006.01)

(52) U.S. Cl.
CPC ............ *B67D 1/0894* (2013.01); *A47J 31/52*
(2013.01); *A47J 31/60* (2013.01); *B67D 1/07*
(2013.01); *B67D 1/0888* (2013.01); *B67D*
*2210/00076* (2013.01); *B67D 2210/00078*
(2013.01)

(58) Field of Classification Search
CPC .................................................. G06Q 10/0836
See application file for complete search history.

(56) References Cited

U.S. PATENT DOCUMENTS

| | | | |
|---|---|---|---|
| 8,989,893 B2 * | 3/2015 | Jones ........................ | A23G 9/22 221/24 |
| 2011/0139809 A1 * | 6/2011 | Sawh ....................... | G07F 9/105 221/150 A |
| 2016/0027132 A1 * | 1/2016 | Craparo .................. | G06Q 50/12 705/15 |

(Continued)

*Primary Examiner* — Gene O Crawford
*Assistant Examiner* — Ayodeji T Ojofeitimi
(74) *Attorney, Agent, or Firm* — Antony P. Ng; Russell
Ng PLLC

(57)       ABSTRACT

An apparatus for preparing custom-ordered beverages is
disclosed. The apparatus includes cup dispensers, beverage
dispensing systems having dispensing heads, two cup-trans-
fer mechanisms, two pick-up stations, and a disposal bin.
Each of the pick-up stations includes a conveyer and a set of
beverage pick-up windows. The first cup-transfer mecha-
nism transports a cup from a cup dispenser to a dispensing
head to fill the cup with beverage. The second cup-transfer
mechanism transports the cup with filled beverage to one of
two pick-up stations. A conveyer at one of the two pick-
stations moves the cup with filled beverage and stops to
present it at each pick-up window at one of the two pick-
stations. If a customer does not pick the cup within an
allocated amount of time, it will be dropped into the disposal
bin.

20 Claims, 15 Drawing Sheets

100

(56)        References Cited

U.S. PATENT DOCUMENTS

2016/0095464 A1*  4/2016  Jones ................. A47J 31/4403
                                                                62/177
2020/0375388 A1*  12/2020  MacFarlane ....... G06Q 20/3224
2021/0386245 A1*  12/2021  Dayton ............ G06Q 10/06315
2023/0143464 A1*  5/2023  Rossetti ............... A47J 43/042
                                                                366/110

* cited by examiner

100

APPARATUS FOR PREPARING AND DELIVERING CUSTOM-ORDERED CAFFEINATED BEVERAGES

CROSS-REFERENCE TO RELATED APPLICATIONS

The present application claims the priority of U.S. patent application Ser. No. 18/099,485, filed on Jan. 20, 2023, the contents of which are incorporated herein by reference in their entirety.

TECHNICAL FIELD

The present application relates to beverage preparation and delivery machines in general, and, in particular, to an apparatus for preparing and delivering custom-ordered caffeinated beverages.

BACKGROUND

Upscale retail coffee shops can typically offer a wide range of freshly made hot beverages for their customers. For example, a customer may order an iced coffee made from freshly ground beans selected by the customer, then brewed to order before ice is added. These made-to-order beverage offerings typically require a wide range of equipment and skilled personnel to operate. In addition, it is relatively time-consuming to prepare made-to-order beverages. Many customers desire made-to-order beverages, but they typically do not like the long wait time for the beverages to be prepared.

Consequently, it would be desirable to provide an improved beverage preparation and delivery apparatus that overcomes the above-identified problems.

SUMMARY OF THE INVENTION

In accordance with a preferred embodiment, an apparatus for preparing and delivering custom-ordered caffeinated beverages includes a housing containing a set of cup dispensers, various beverage dispensing systems having their dispensing heads, two cup-transfer mechanisms, two pick-up stations, and a disposal bin. Each of the pick-up stations includes a conveyer and a set of beverage pick-up windows. The first cup-transfer mechanism transports a cup from one of the cup dispensers to one of the dispensing heads to fill the cup with beverage. The second cup-transfer mechanism transports the cup with filled beverage to one of two pick-up stations. A conveyer at one of the two pick-stations moves the cup with filled beverage and stops to present it at each pick-up window at one of the two pick-stations. If a customer does not pick the cup with filled beverage within an allocated amount of time, the cup with filled beverage will be dropped into the disposal bin located between the two conveyors.

The apparatus also includes a self-cleaning subsystem such that it is capable of being self-cleaned automatically at a predetermined time of the day without human intervention.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
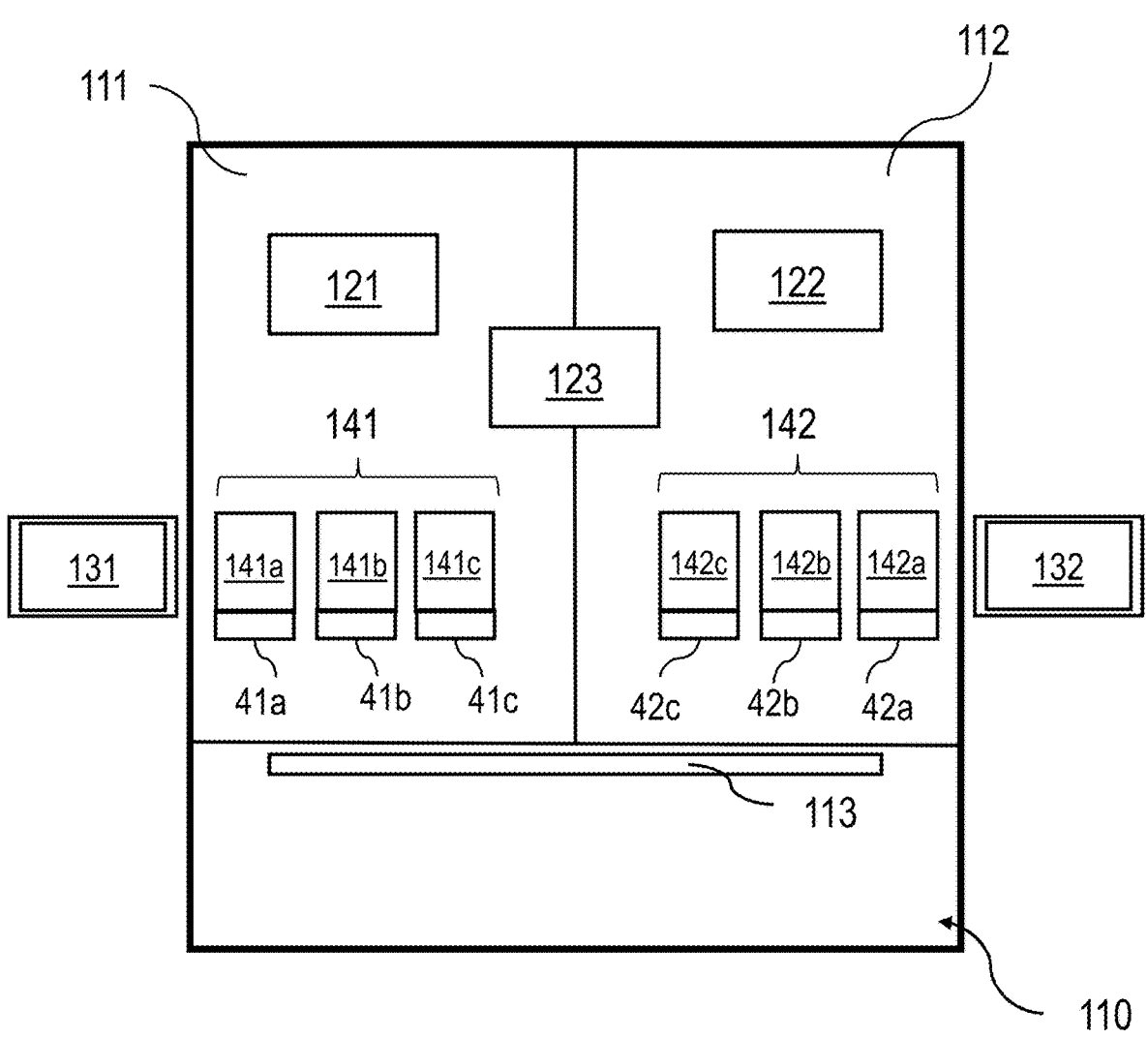
FIG. 1 is a front view of an apparatus for preparing and delivering custom-ordered caffeinated beverages, in accordance with one embodiment of the present invention.
Figure 7:
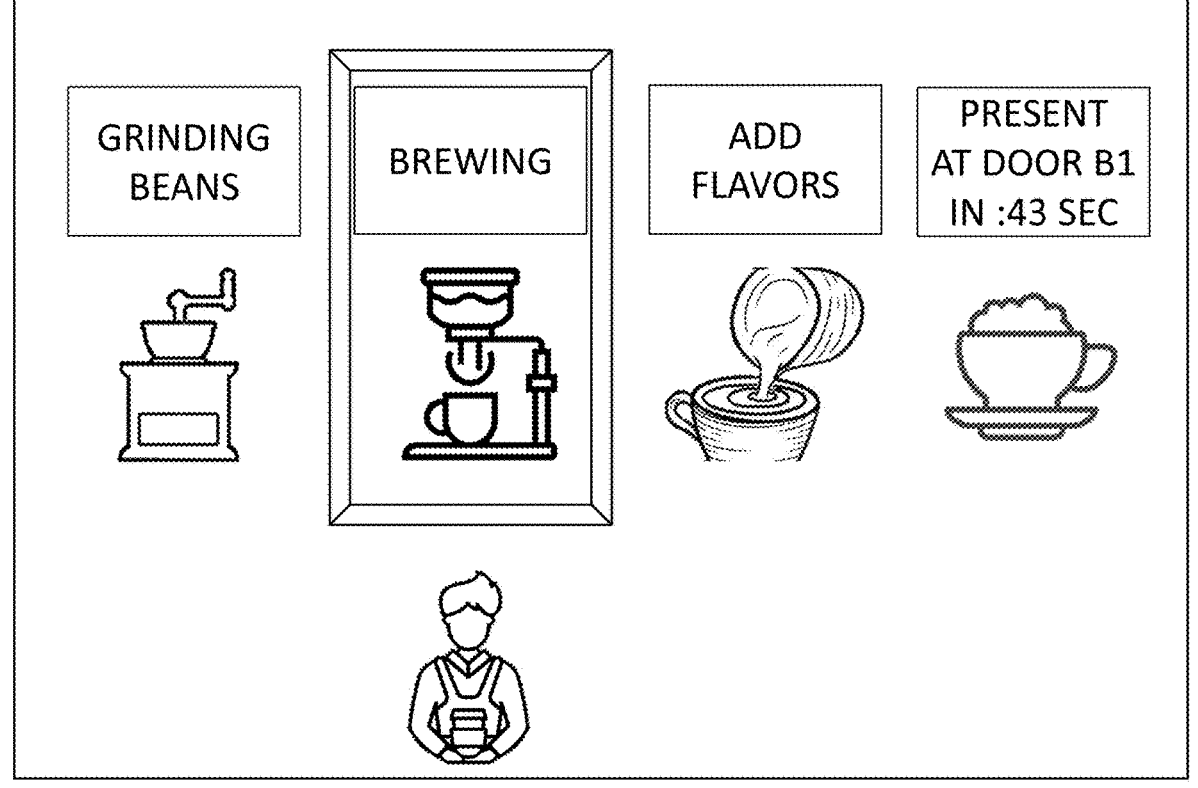
FIG. 7 illustrates an exemplary screen showing the progress of a beverage order that is currently being prepared.

Referring now to the drawings and in particular to FIG. 1, there is depicted an apparatus for preparing and delivering custom-ordered caffeinated beverages, in accordance with one embodiment. As shown, an apparatus 100 includes a housing 110 measuring about 5 feet wide, 3 feet deep, and 7 feet tall. Housing 110 includes a left front door 111 and a right front door 112. Left front door 111 includes an order progress display 121, and right front door 112 includes an order progress display 122. Order progress display 121 shows the preparation progress of a first beverage. Order progress display 122 shows the preparation progress of a second beverage. FIG. 7 illustrates an exemplary screen on order progress displays 121, 122.

Left front door 111 also includes a beverage pick-up station 141, and right front door 112 also includes a beverage pick-up station 142. Pick-up stations 141 and 142 are preferably located at least 2.5 feet apart from each other, which allows customers to pick up their beverages without being crowded by others. For the present embodiment, pick-up station 141 has three pick-up windows 141a-141c, each of which can be covered by a corresponding one of doors 41a-41c. Similarly, pick-up station 142 has three pick-up windows 142a-142c, each of which can be covered by a corresponding one of doors 42a-42c. Preferably, doors 41a-41c and 42a-42c remain locked until a beverage is ready to be picked up by a customer. A customer may pick up his/her beverage at one of pick-up windows 141a-141c, 142a-142c when its door is opened. Although FIG. 1 shows that each of pick-up stations 141, 142 has three pick-up windows, alternative embodiments may include more or fewer pick-up outlets. A shelf 113 is located below pick-up stations 141, 142 on which a customer can place a first beverage before accessing a second beverage.

Customers can order beverages via any of ordering panels 131, 132. Ordering panels 131, 132 can be attached to housing 110 or located in physical proximity to housing 110. Ordering panels 131, 132 are preferably implemented with a touch-screen display. Instead of using ordering panels 131, 132, customers may also send beverage orders remotely via a mobile device (such as a mobile phone, a smartwatch, or a computer tablet), a desktop or laptop computer over the Internet.

When a completed beverage is ready to be picked up, a customer can use an order queue display 123 to unlock one of doors 142a-142c, 110a-110c. For example, order queue display 123 can inform a customer to access his/her beverage by touching a graphical representation of its named cup displayed on order queue display 123, and the corresponding one of doors 141a-141c, 142a-142c will be opened for the customer to pick up the completed beverage. Alternatively, order progress displays 121, 122 can be used to inform a customer to access his/her beverage by touching a graphical representation of its named cup displayed on order progress displays 121, 122.

Figure 8:
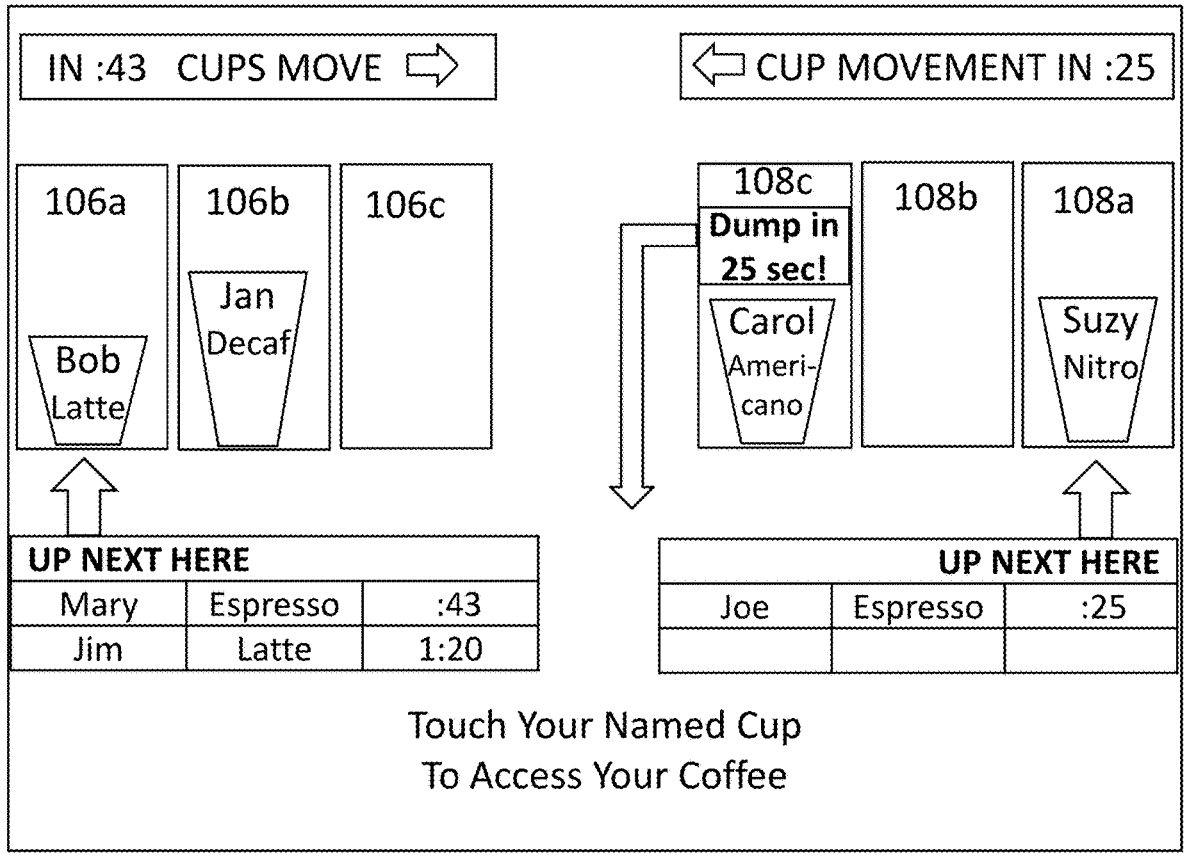
FIG. 8 illustrates an exemplary screen showing an order queue and the customers' orders that are ready to be picked up at corresponding pick-up windows.

In addition to allowing a customer to open a door of a pick-up window, order queue display 123 also shows a queue of all pending beverage orders to allow customers to know how long it will take for their beverage to be ready for pick up. FIG. 8 is an exemplary screen on order queue display 123 showing an order queue and customers' orders that are ready to be picked up. Order queue display 123 is preferably implemented with a touch-screen display.

Each of pick-up windows 141a-141c, 142a-142c is equipped with a sensor (not shown) to detect if a customer's hand is inside a pick-up window. The door of a pick-up window will not close when the customer's hand is detected to prevent the door from inadvertently closing on the customer's hand.

Figure 2:
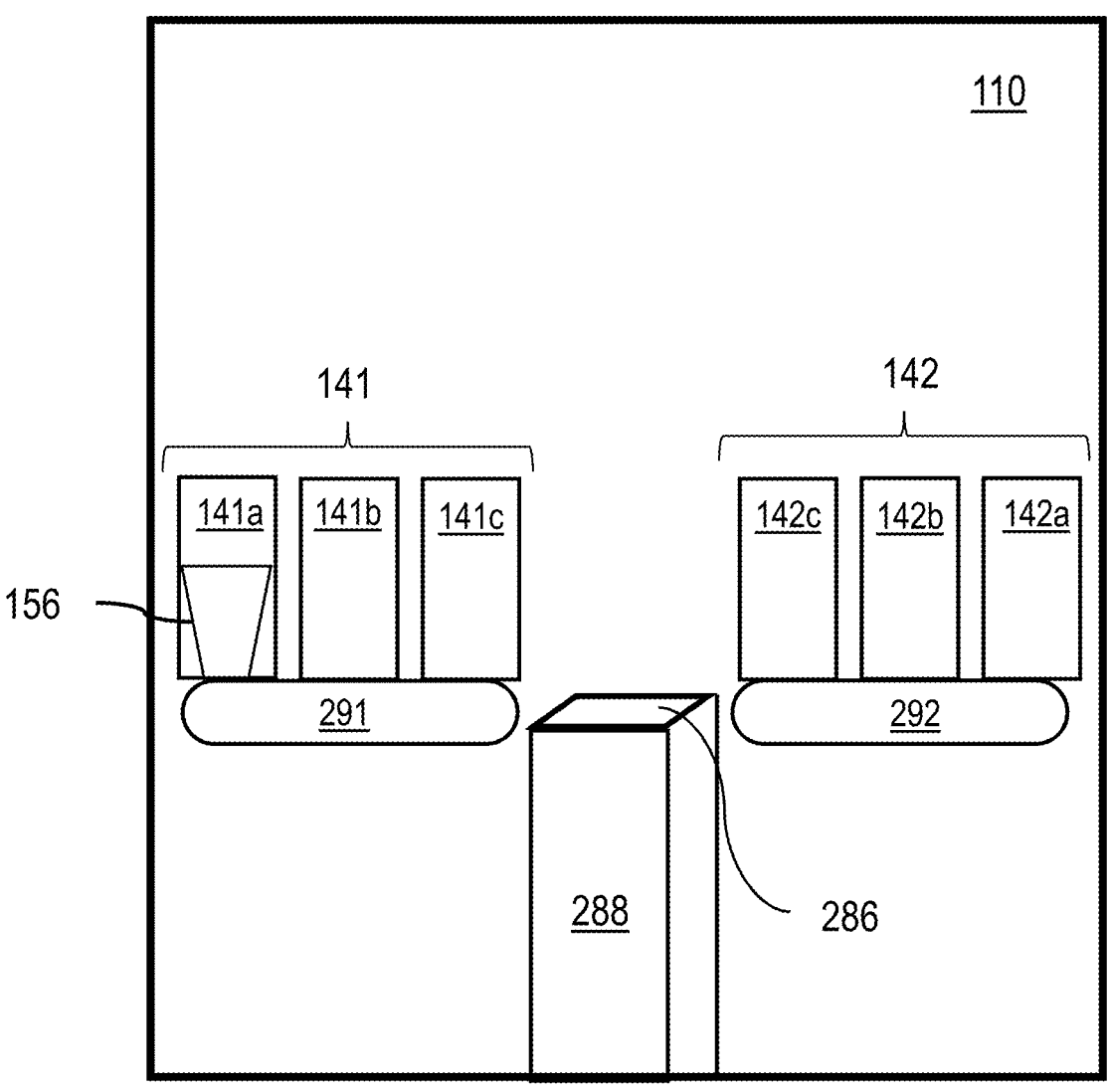
FIG. 2 depicts two conveyors for conveying completed beverages within the apparatus from FIG. 1.

With reference now to FIG. 2, there is illustrated two conveyors for conveying completed beverages within housing 110. As shown, conveyors 291, 292 are located below pick-up stations 141, 142, respectively. In addition, conveyor 291 is preferably attached to the back side of left front door 111, and conveyor 292 is preferably attached to the back side of right front door 112. Thus, conveyors 291, 292 move outside of housing 110 when front doors 111, 112 are opened. This enables easier cleaning of the beverage dispensing and cup movement areas located within housing 110.

After the preparation of a beverage has been completed, the completed beverage will be placed on conveyor 291 at pick-up window 141a or conveyor 292 at pick-up window 142a. At this time, order queue display 123 (or order progress displays 121, 122) notifies a customer that his/her completed beverage is ready to be picked up. After the customer touches his/her name on the screen of the display, door 41a at pick-up window 141a or door 42a at pick-up window 142a will be opened so that the customer can pick up his/her completed beverage.

If the customer does not pick up his/her completed beverage at pick-up window 141a (or pick-up window 142a), conveyor 291 (or conveyor 292) will move the completed beverage to pick-up window 141b (or pick-up window 142b). If the customer does not pick up his/her completed beverage at pick-up window 141b (or pick-up window 142b), conveyor 291 (or conveyor 292) will move the completed beverage to pick-up window 141c (or pick-up window 142c). Conveyor 291 (or conveyor 292) is designed to stop at three pick-up points to place the completed beverage at pick-up windows 141a-141c (or pick-up windows 142a-142c).

If the customer does not pick up the completed beverage at pick-up window 141c (or pick-up window 142c) within an allotted amount of time, conveyor 291 (or conveyor 292) will move the completed beverage forward to discard it from conveyor 291 (or conveyor 292) into a disposal bin 288 provided between opposing conveyors 291 and 292 via an opening 286. For example, a cup 156 with completed beverage that is located on conveyor 291 will be dropped off from conveyor 291 into disposal bin 288 through opening 286 after three stops. This will eliminate any potential "logjam" caused by completed beverages not picked up by customers on time.

The allotted time window for the customer to pick up his/her completed beverage after it is placed on conveyor 291, 292 can be extended by alternating which one of pick-up stations 141, 142 (and thus which one of conveyors 291, 292) the next completed order is delivered to. Thus, if a completed beverage order is delivered to pick-up station 141 and placed on one of pick-up windows 141a-141c on conveyor 291, the next completed beverage order can be delivered to pick-up station 142 and placed on one of pick-up windows 142a-142c on conveyor 292, and so on. In this way, the allotted time window between placement of a beverage order by a customer and discarding the completed beverage from conveyor 291 or 292 can be extended from the time it takes to place and prepare three subsequent beverage orders to the time it takes to place and prepare six subsequent beverage orders.

Figure 3:
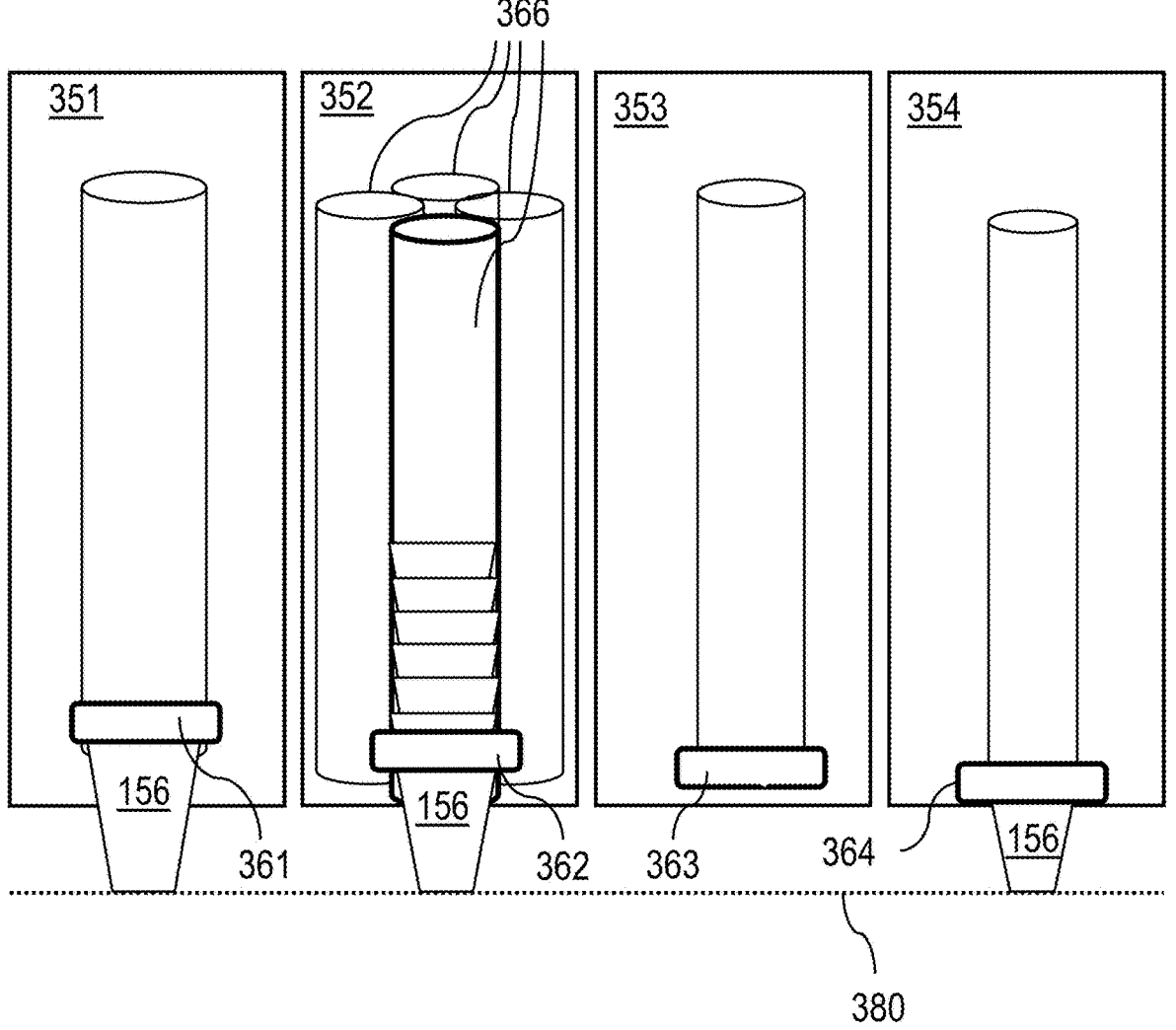
FIG. 3 illustrates multiple cup turrets within the apparatus from FIG. 1.

Referring now to FIG. 3, there are illustrated various cup turrets within housing 110 for dispensing cups to hold prepared beverages. For the present embodiment, housing 110 includes four cup turrets 351-354 that can be readily removable from and attachable to housing 110. Each of cup turrets 351-354 is able to hold about 100 cups. Each of cup turrets 351-354 dispenses cups 156 of a particular size, such as small, medium, large, or extra large. Housing 110 may include any number of cup turrets and any combination of sizes of cups based on the preferences of food-service operators.

Each of cup turrets 351-354 includes a set of vertical tubes 366 each of which contains a sleeve of cups of a particular size. As an example, cup turret 352 includes four vertical tubes 366. When all of the cups in a particular vertical tube 366 of a cup turret have been dispensed, the cup turret rotates until another sleeve of cups is positioned to drop into its corresponding one of cup dispensers 361-364.

The vertical distance between each of cup turrets 351-354 and its corresponding one of cup dispensers 361-364 varies, depending on the size of the cups contained in the cup turret to place the bottoms of cups 156 that are next to be dropped from each of cup dispensers 361-364 in the same horizontal plane 380 regardless of the size of cup 156. In this way, the distances that cups 156 drop from one of cup dispensers 361-364 to a cup-transfer mechanism (described below) within housing 110 are the same for each cup 156 regardless of cup size.

Figure 4:
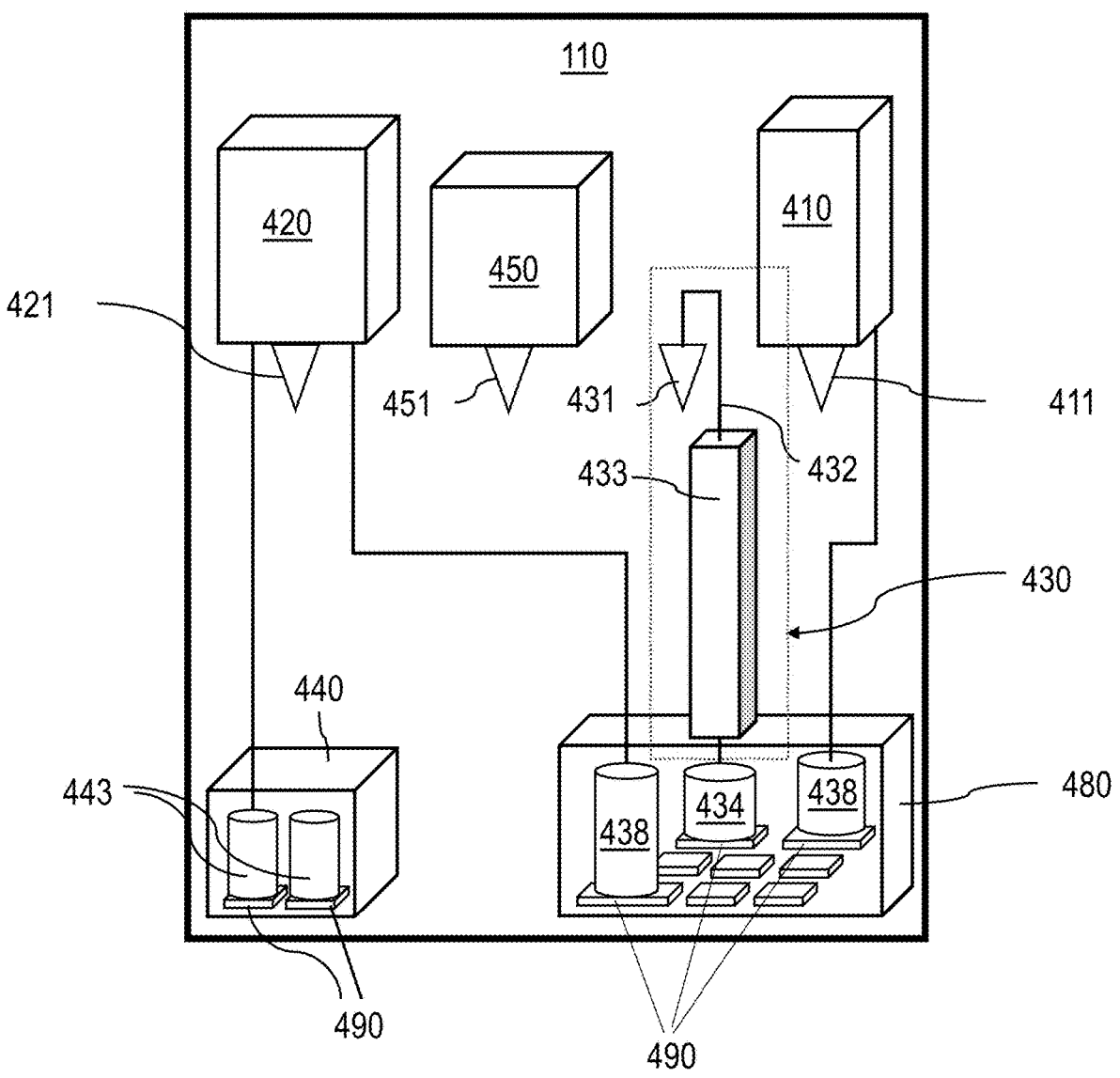
FIG. 4 depicts various beverage dispensing systems within the apparatus from FIG. 1.

With reference now to FIG. 4, there is illustrated various beverage dispensing systems within housing 110. As shown, housing 110 includes a bean-to-cup coffee dispensing system 410, a specialty coffee dispensing system 420, and a cold brew and nitro coffee dispensing system 430. Bean-to-cup coffee dispensing system 410 is connected to a dispensing head 411, specialty coffee dispensing system 420 is connected to a dispensing head 421, and cold brew and nitro coffee dispensing system 430 is connected to a dispensing head 431. Housing 110 also includes an ice dispensing system 450 connected to a dispensing head 451. Coffee dispensing systems such as bean-to-cup coffee dispensing system 419, specialty coffee dispensing system 420, cold brew and nitro coffee dispensing system 430, and ice dispensing system 450 are well-known in the art and will not be discussed in detail.

Cold brew and nitro coffee dispensing system 430 includes cold-brew coffee concentrate stored in a reservoir 434 and a nitrogen source (not shown), both located in a refrigerator 480. Alternatively, nitrogen source can be located outside of refrigerator 480. Cold brew and nitro coffee dispensing system 430 also includes a cooling tower 433 for cooling a line 432 that passes cold-brew coffee coming out from reservoir 434. Before reaching dispensing head 431, nitrogen can be added to the cold-brew coffee to make nitrogen-infused cold-brew coffee based on a customer's selection.

A set of load cells 490 is provided within refrigerator 480 to detect the amount of liquid stored inside reservoirs 434, 438. For example, reservoir 434 storing cold-brew coffee concentrate sits on one of load cells 490 that can sense when the weight of reservoir 434 has dropped below a predetermined weight, which means the cold-brew coffee concentrate in reservoir 434 needs to be replenished or replaced. Similarly, when the weight of reservoir 438 storing milk drops below a predetermined weight, it means that milk needs to be replenished or replaced. Instead of using load cells, other sensors such as resistive probes, optical sensors, and float switches, or various methods of measuring dispensed volumes, can also be utilized to monitor if the fluid within a reservoir has dropped below a predetermined level and needs to be replenished or replaced.

Other reservoirs contain "add-ins" to allow customers to choose to include in their beverage order. Such add-ins may include flavorings (chocolate, caramel, vanilla, sugar-free vanilla, hazelnut, and chai), milks (dairy and non-dairy), nitrogen gas (for nitro-infused cold brew coffee), ice, etc. For example, a flavor station 440 includes several bottles or bags-in-boxes (BIBs) 443 of add-ins. Load cells 490 are also provided within flavor station 440 to detect the amount of add-ins stored inside various BIBs 443. When the add-in in a BIB has dropped below a predetermined weight, it means that the add-ins in that BIB needs to be replenished or replaced.

Figure 4A:
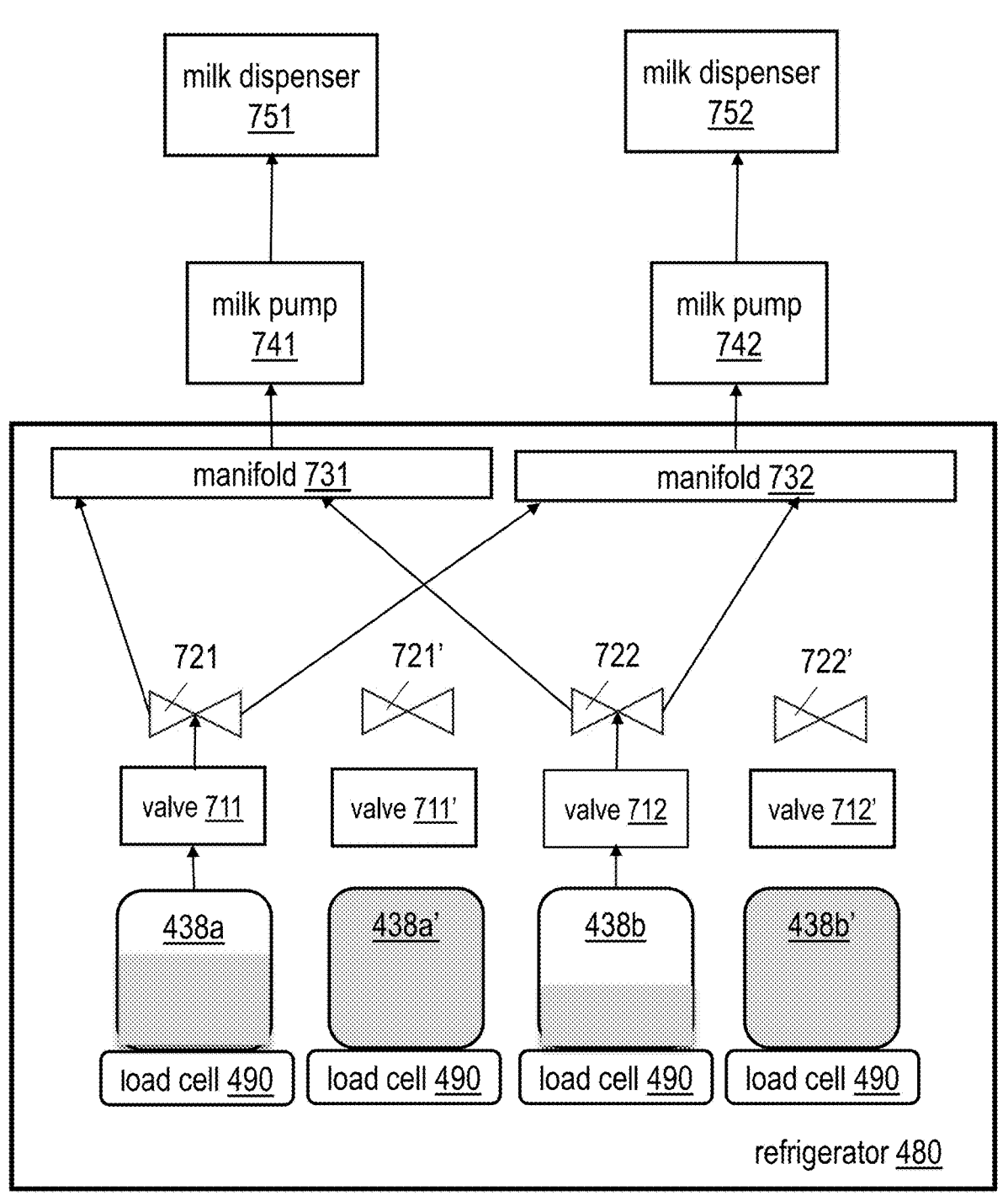
FIGS. 4A-4C depict a milk dispensing system within the apparatus from FIG. 1.
Figure 4B:
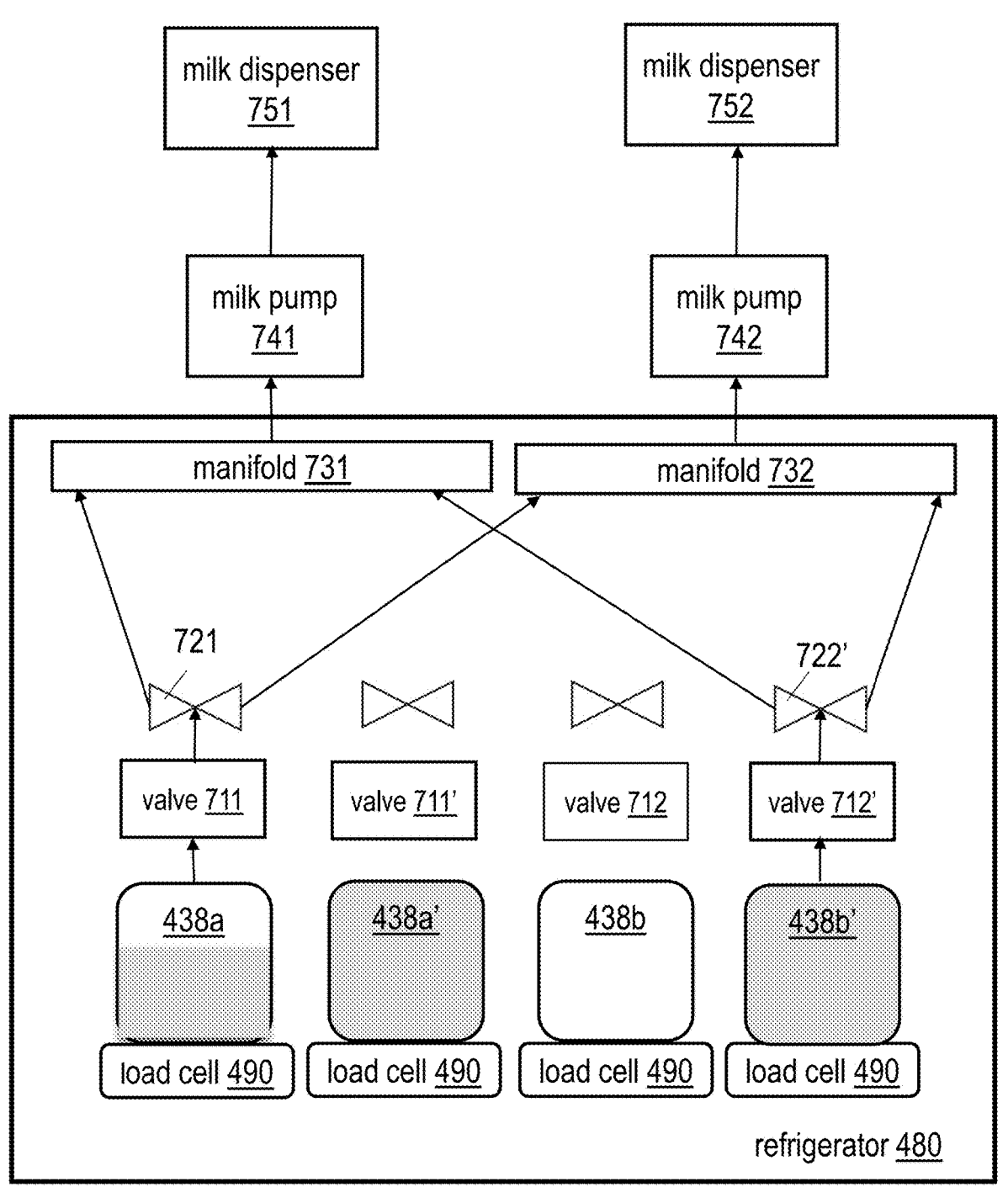
Figure 4C:
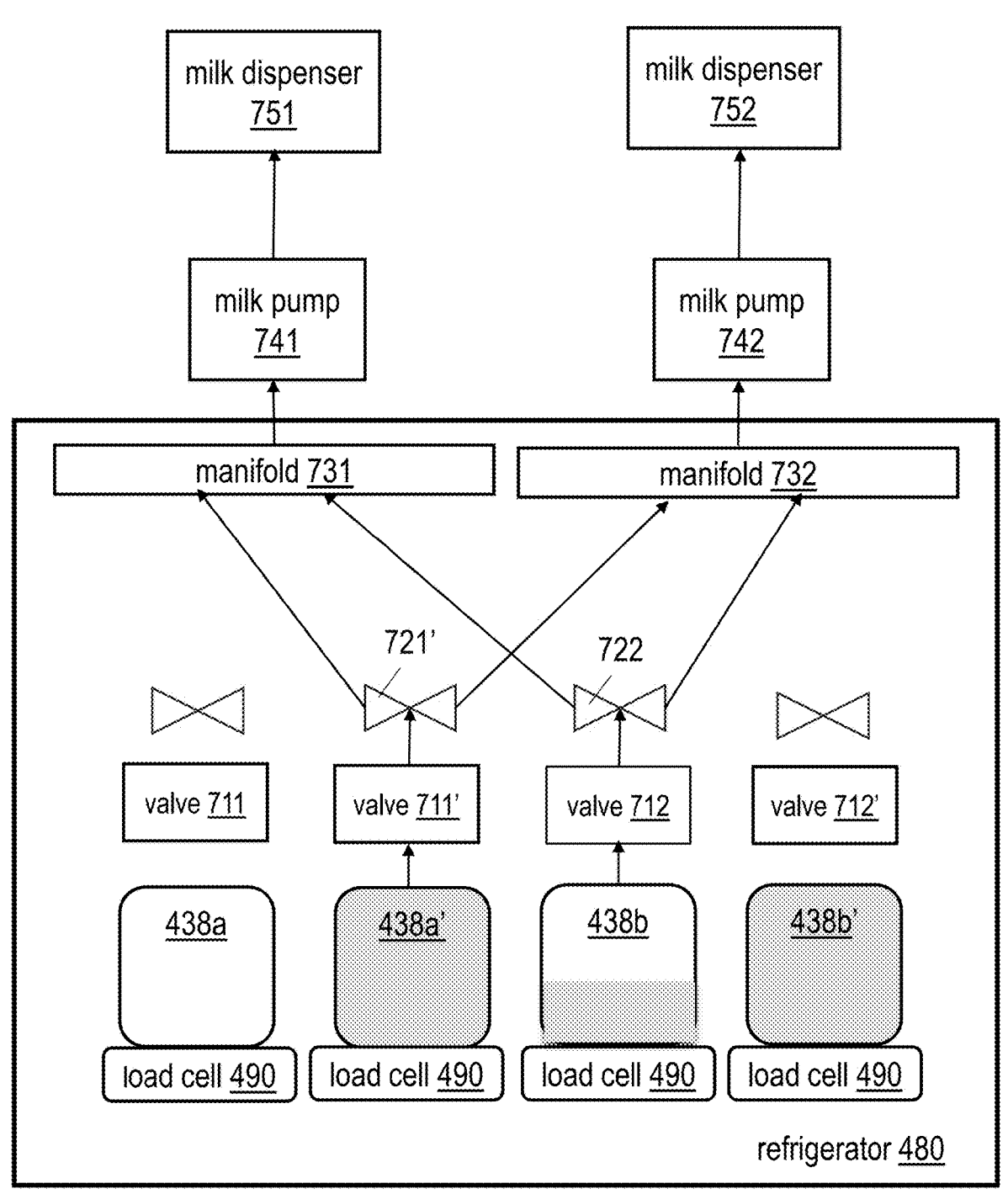

Referring now to FIGS. 4A-4C, there are illustrated a milk dispensing system, according to one embodiment. In FIG. 4A, the milk dispensing system is shown to have two separate milk delivery channels, although more milk delivery channels can be added. The first milk delivery channel includes reservoirs 438a, 438a', valves 711, 711', and diverters 721, 721'. The second milk delivery channel includes reservoirs 438b, 438b', valves 712, 712', and diverters 722, 722'. Reservoirs 438a-438a', 438b-438b', valves 711-711', 712-712', and diverters 721-721', 722-722' are located within refrigerator 480. For the present embodiment, housing 110 has five separate milk delivery channels, and refrigerator 480 can hold up to ten one-gallon reservoirs 438 of various types of dairy milks (such as whole milk, half-and-half, 2% milk, and skim milk) and/or non-dairy milks (such as soy milk, almond milk, and oat milk). With five separate milk delivery channels, five different types of dairy or non-dairy milks can be served.

During normal operations, both the first and second milk delivery channels in FIG. 4A can work concurrently. However, within each of the first and second milk delivery channels, only one of two valves and diverters can be activated to draw milk from its associated reservoir. For example, only valve 711 and diverter 721 within the first milk delivery channel are activated to draw milk from reservoir 438a, and only valve 712 and diverter 722 within the second milk delivery channel are activated to draw milk from reservoir 438b. Diverter 721 may send milk to either manifold 731 or 732, and diverter 722 may send milk to either manifold 731 or 732. The milk in manifold 731 travels to milk pump 741 and then to milk dispenser 751. The milk in manifold 732 travels to milk pump 742 and then to milk dispenser 752.

If the milk in, for example, reservoir 438b has been completely depleted, then valve 712' and diverter 722' within the second milk delivery channel will be automatically activated (i.e., without human intervention) to draw milk from reservoir 438b', as shown FIG. 4B. Similarly, if the milk in reservoir 438a has been completely depleted, then valve 711' and diverter 721' within the first milk delivery channel will be automatically activated to draw milk from reservoir 438b, as shown FIG. 4C.

Figure 4D:
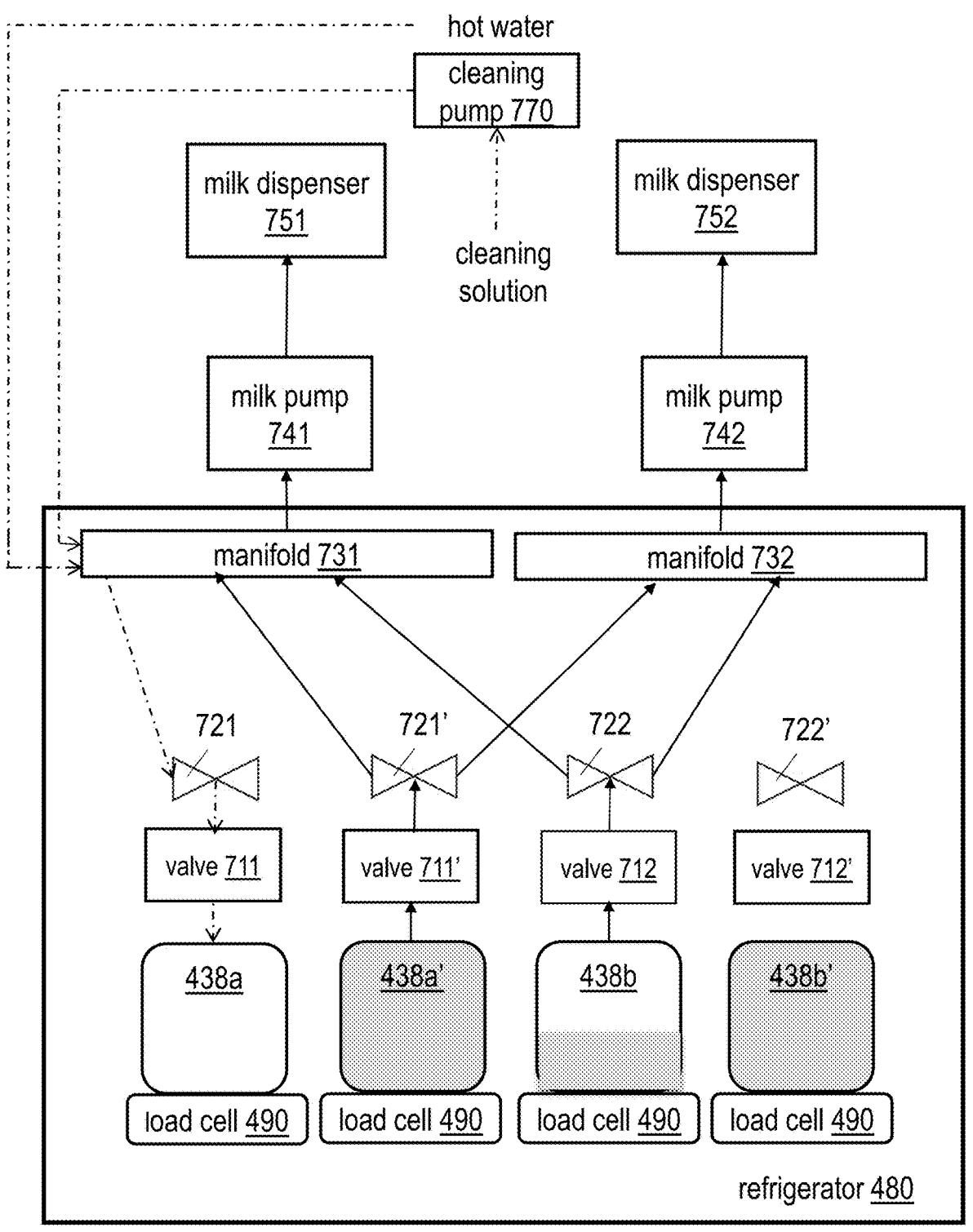
FIGS. 4D-4E depict a self-cleaning subsystem for the milk dispensing system from FIGS. 4A-4C.

Before replacing reservoir 438a with a new reservoir containing milk, the milk lines between reservoir 438a and manifold 731 need to be cleaned via a two-step process. First step: a cleaning solution is sent to manifold 731 via a cleaning pump 770, as shown in FIG. 4D, and the cleaning fluid travels from manifold 731 to diverter 721 and to reservoir 438a via valve 711. Second step: hot water is sent to manifold 731, as shown in FIG. 4D, and the hot water travels from manifold 731 to diverter 721 and to reservoir 438a via valve 711. The first and second steps are performed automatically without any human intervention. At this point, the milk lines between manifold 731 and reservoir 438a are cleaned, and reservoir 438a (containing dirty fluids) is now ready to be replaced with a new reservoir containing the correct type of milk by an operator. The operator can perform this reservoir 438a replacement at his/her convenience. The operator can disconnect reservoir 438a at valve 711, and then connects a new reservoir at valve 711. Reservoir 438a may be discarded or recycled.

Figure 4E:
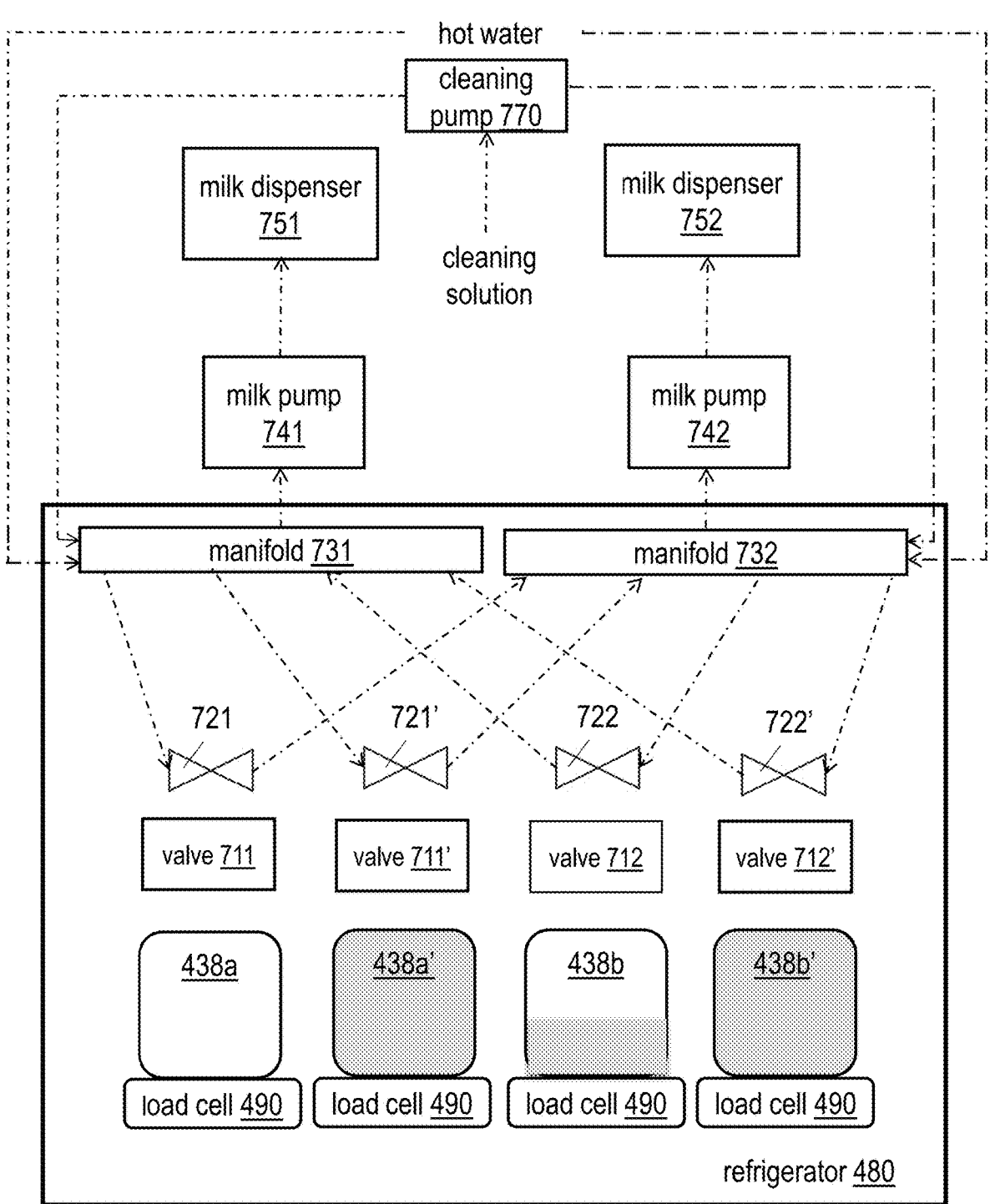

In addition, the milk lines between all reservoirs 438a-438a', 438b-438b' and milk dispenser 751, 752 need to be cleaned every night via a two-step process. First step: a cleaning solution is sent to manifolds 731, 732 via cleaning pump 770, as shown in FIG. 4E. The cleaning fluid travels from manifolds 731, 732 to diverters 721-721', 722-722', back to manifolds 731, 732, and to milk pumps 741, 742 and milk dispensers 751, 752. Second step: hot water is sent to manifolds 731, 732, as shown in FIG. 4E. The hot water travels from manifolds 731, 732 to diverters 721-721', 722-722', back to manifolds 731, 732, and to milk pumps 741, 742 and milk dispensers 751, 752. The first and second steps are performed automatically without any human intervention. At this point, the milk lines between all reservoirs 438a-438a', 438b-438b' and milk dispenser 751, 752 are cleaned, and the daily self-cleaning process is completed. Preferably, this self-cleaning process is performed at, for example, 1:00 a.m. every day.

The self-cleaning subsystem for the milk dispensing system can also be applied to clean the coffee lines, if necessary.

Figure 5:
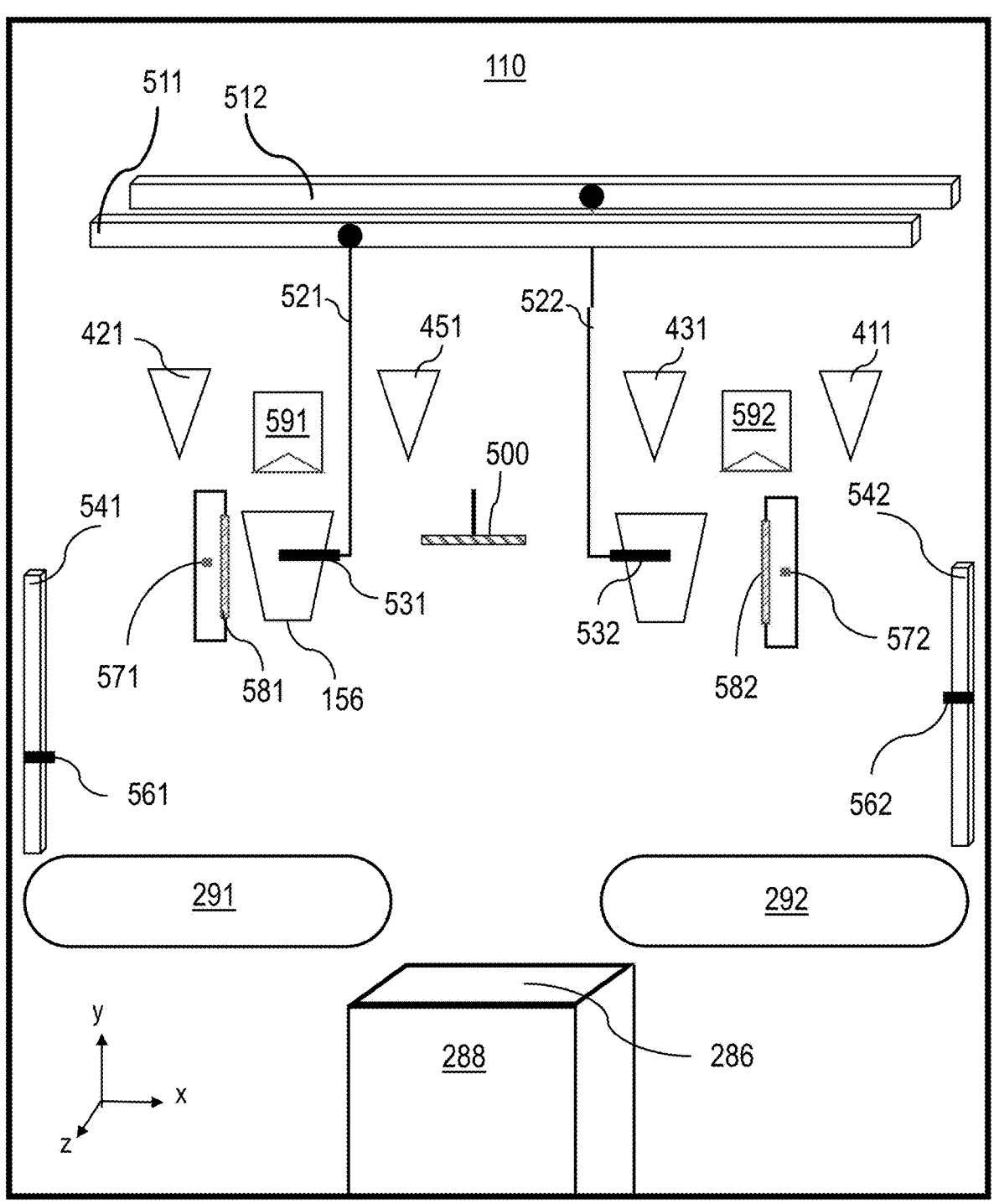
FIG. 5 depicts first and second cup-transfer mechanisms within the apparatus from FIG. 1.

Referring now to FIG. 5, there are illustrated a first and second cup-transfer mechanisms for transporting beverage cups within housing 110. The purpose of the first cup-transfer mechanism is to fetch and transport beverage cups from one of cup dispensers 364a-364d to one of dispensing heads 411, 421, 431, 451. As shown, the first cup-transfer mechanism includes a cup support 531 connected to a rail 511 via a telescopic rod 521, and a cup support 532 connected to a rail 512 via a telescopic rod 522. Cup supports 531, 532 are allowed to move only on an x-y plane of housing 110. Aligned along an x-axis of housing 110, both rails 511, 512 are located above dispensing heads 411, 421, 431, 451 in order to prevent rails 511, 512 from getting any beverage spilling.

The purpose of the second cup-transfer mechanism is to transport cups with completed beverages from one of dispensing heads 411, 421, 431, 451 to one of pick-up stations 141, 142 (from FIG. 1) at which conveyers 291, 292 are located. As shown, the second cup-transfer mechanism includes a cup support 561 connected to a rail 541, and a cup support 562 connected to a rail 542. Rails 541, 542 are located at opposite sides of housing 110. Rails 541, 542 are parallel to each other and located along the y-axis of housing 110. Cup supports 561, 562 are allowed to move only on a y-z plane of housing 110.

Figure 5A:
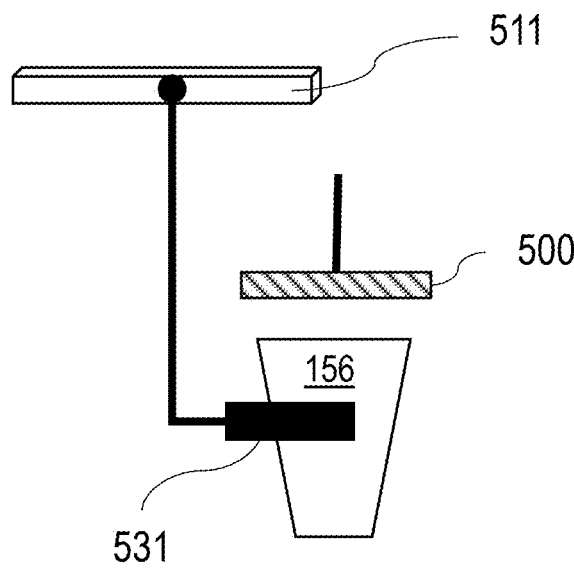
FIG. 5A-5B illustrate how a plunger works within the first cup-transfer mechanism.
Figure 5B:
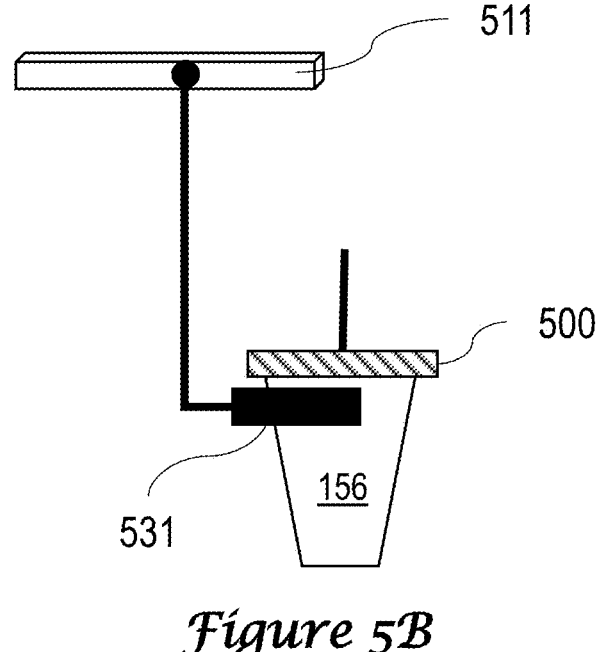

Since cup supports 531 and 532 of the first cup-transfer mechanism are identical, only cup support 531 will be further described in detail. After cup support 531 has fetched a cup 156 from one of cup dispensers 361-364, cup support 531 travels on the x-y plane of housing 110 to move cup 156 to a location below a plunger 500 at which point plunger 500 can push cup 156 slightly downward such that cup 156 is properly seated within cup support 531, as shown in FIGS. 5A-5B.

After cup 156 has been properly seated within cup support 531, cup support 531 then travels along rail 511 to move cup 156 to one of dispensing heads 411, 421, 431, 451 from which the appropriate coffee (and add-ins) for making the customer's beverage order can be dispensed into cup 156.

While beverage is being dispensed into cup 156, one of two laser engravers 571, 572 begins to engrave marking information about the customer's beverage order onto cup 156. This marking information preferably takes the form of a barcode (or a QR code) that enables a cashier at the checkout to properly tally up the total cost of the customer's beverage by scanning the barcode at a point-of-sale (POS) system to identify the name of the beverage plus any add-ins (such as flavorings and sweeteners), instead of just charging the customer based only on the cup size.

For the present embodiment, laser engraver 571 is located in close proximity to dispensing heads 421, 451, and laser engraver 572 is located in close proximity to dispensing heads 431, 411. Laser engravers 571, 572 are protected by splash guards 581, 582, respectively, from beverage splashes that may occur when beverage is being dispensed into cup 156. Splash guards 581, 582 are transparent to laser beams. In addition, an air curtain and/or a spritz of hot water can be delivered over splash guards 581, 582 in order to clean any beverage spillage and/or particulates that have landed on splash guards 581, 582.

In addition, infrared cameras 591, 592 are utilized to verify various aspects of the beverage ordered by the customer, including the size of the cup that contains the completed beverage, the level of the beverage contained within the cup, and the approximate temperature of the beverage contained within the cup.

As mentioned above, the second cup-transfer mechanism includes cup supports 561, 562 and rails 541, 542 located along the y-axis of housing 110. Since cup supports 561 and 562 are identical to each other, only cup support 561 will be further described in details.

Figures 6A, 6B, 6C:
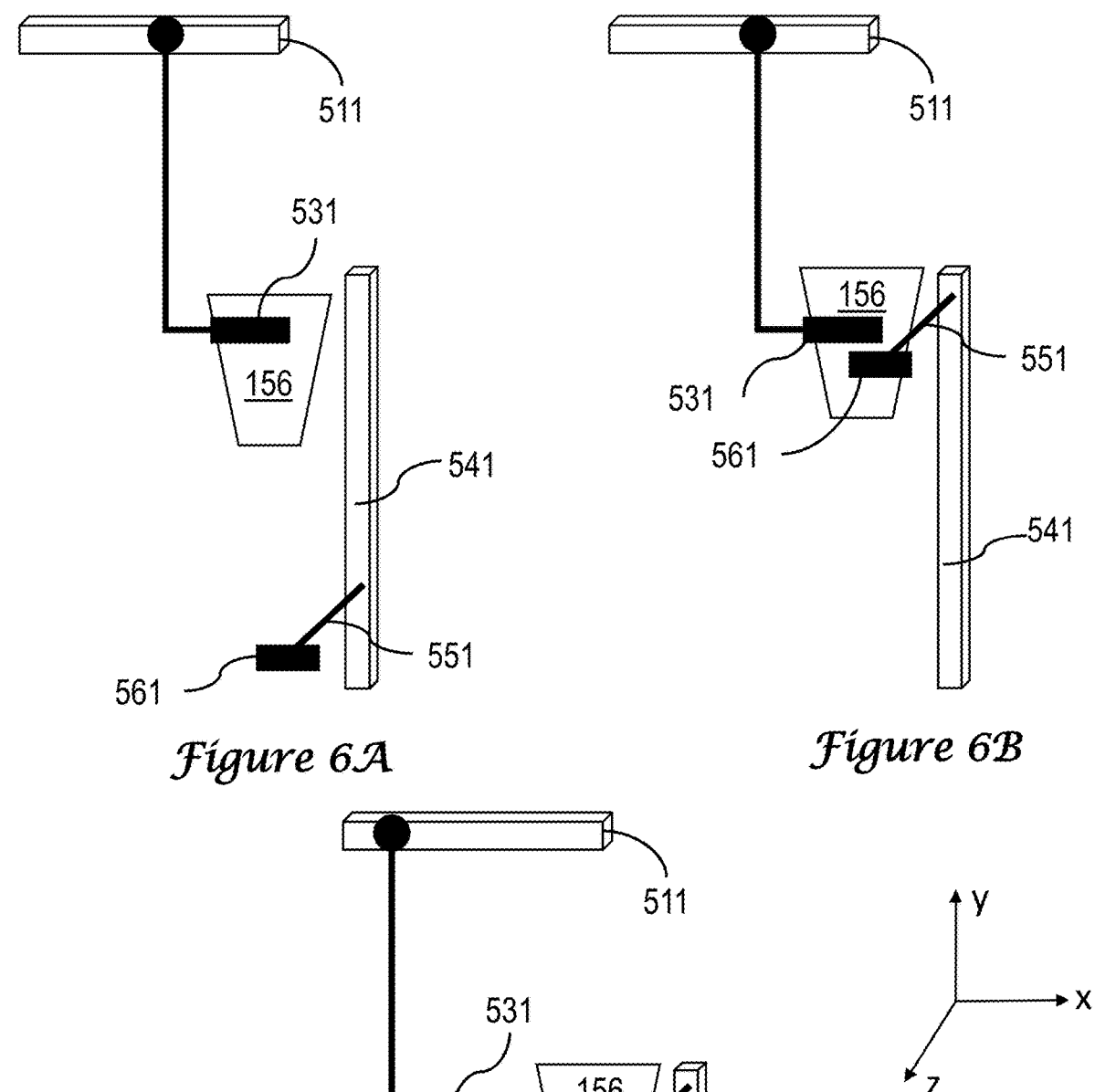
FIGS. 6A-6C illustrate the transfer of a cup from a first cup-transfer mechanism to a second cup transfer mechanism.

With reference now to FIGS. 6A-6F, there are illustrated the transfer of a cup from the first cup transfer mechanism to the second cup transfer mechanism, and then to one of conveyers 291, 292. Cup support 561 is designed to receive cup 156 with the completed beverage from cup support 531 of the first cup-transfer mechanism. Prior to receiving cup 156 from cup support 531, cup support 561 is positioned below cup support 531, as shown in FIG. 6A.

As shown, cup support 561 is connected to rail 541 via a telescopic rod 551 that can extend along the z-axis of housing 110. Specifically, telescopic rod 551 is orthogonally connected rail 541. The x, y, and z axes of housing 110 are mutually perpendicular to each other.

The size of cup support 561 is smaller than the size of cup support 531 so that cup support 561 engages cup 156 at a portion of cup 156 that is lower (and thus has a smaller diameter) than the portion of cup 156 that is engaged by cup support 531. When cup support 531 brings cup 156 with the completed beverage, cup support 561 travels upwardly along rail 541 until it receives cup 156 therein. Cup support 561 then continues to travel upwardly along rail 541 a little further until it lifts cup 156 out of cup support 531, as shown in FIG. 6B. After cup 156 has been secured within cup support 561, cup support 531 then moves away from cup support 561, as shown in FIG. 6C.

Figures 6D, 6E:
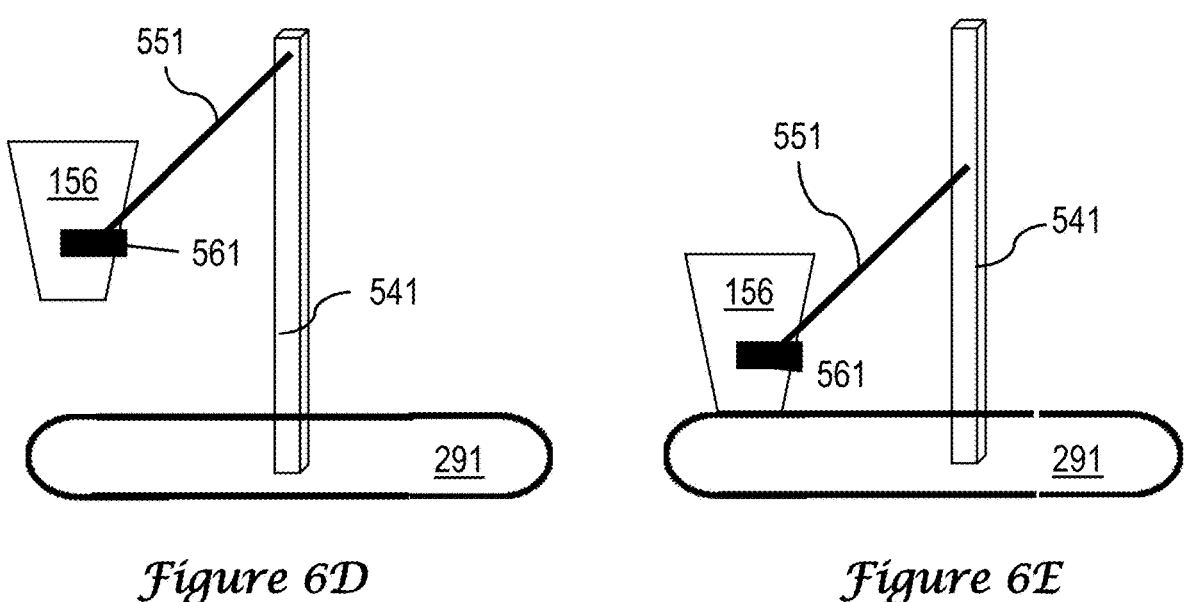
FIGS. 6D-6F illustrates the transfer of a cup from a second cup transfer mechanism to a conveyer.
Figure 6F:
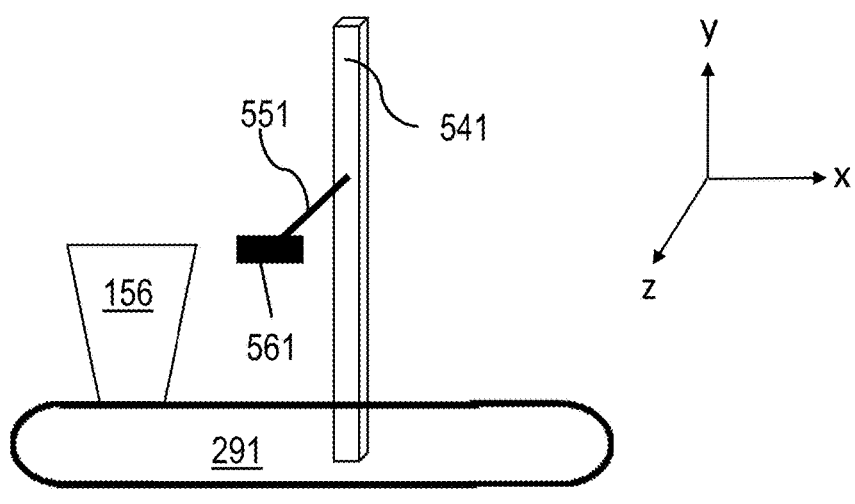

Following the transfer of cup 156 with the completed beverage from cup support 531 to cup support 561, cup support 561 and rod 551 move along rail 541 to approach conveyer 291, and rod 551 is then extended to move cup 156 towards conveyer 291, as shown in FIG. 6D. When cup support 561 reaches a predetermined position over conveyer 291, cup support 561 is lowered along rail 541 to place cup 156 on conveyor 291, as shown in FIG. 6E. Afterwards, cup support 575b retreats from conveyer 291, as shown in FIG. 6F.

As has been described, the present invention provides an apparatus for preparing and delivering custom-ordered caffeinated beverages.

While the invention has been particularly shown and described with reference to a preferred embodiment, it will be understood by those skilled in the art that various changes in form and detail may be made therein without departing from the spirit and scope of the invention.

What is claimed is:

1. An apparatus for preparing and delivering custom-ordered beverages, said apparatus comprising:
   a housing having a plurality of cup dispensers;
   a plurality of beverage dispensing systems, each having a dispensing head;
   a first cup-transfer mechanism for transporting a cup from one of said cup dispensers to one of said dispensing heads to fill said cup with beverage;
   a second cup-transfer mechanism for transporting said cup with filled beverage from one of said dispensing heads to a first or second pick-up station;
   a first set of beverage pick-up windows located at said first pick-up station, and a second set of beverage pick-up windows located at said second pick-up station;
   a first and second conveyers located at said first and second pick-up stations, respectively, wherein one of said first and second conveyers moves said cup with filled beverage and stops to present it at each pick-up window of said first or second set of beverage pick-up windows; and
   a disposal bin, located between said first and second conveyors, for receiving said cup of filled beverage if it has not been picked up by a customer.

2. The apparatus of claim 1, further comprising a first and second ordering panels for receiving beverage orders from customers.

3. The apparatus of claim 1, wherein said housing further includes an order queue display showing an ordering queue.

4. The apparatus of claim 1, further comprising a first and second order progress screen for informing customers regarding the progress of beverage preparations.

5. The apparatus of claim 1, wherein each of said first and second sets of beverage pick-up windows includes an automated door and a sensor for sensing a customer's hand to prevent said automated door closing on said customer's hand.

6. The apparatus of claim 1, wherein said first conveyer is located under said first set of pick-up windows, and said second conveyer is located under said second set of pick-up windows.

7. The apparatus of claim 1, further comprising an infrared camera to verify cup size, beverage level contained within said cup, and/or temperature of beverage contained within said cup.

8. The apparatus of claim 1, further comprising a plunger to ensure a cup is properly situated within a cup support within said first cup-transfer mechanism.

9. The apparatus of claim 1, further comprising a plurality of sensors for sensing the content stored in a container within said beverage dispensing system has been depleted.

10. The apparatus of claim 1, wherein said first cup-transfer mechanism includes a first cup support connected a first rail, wherein said first cup support only moves along an x-y plane of said housing; and a second cup support connected a first rail, wherein said second cup support only moves along said x-y plane of said housing.

11. The apparatus of claim 10, wherein said second cup-transfer mechanism includes a third cup support connected a third rail, wherein said third cup support only moves along an y-z plane of said housing, wherein said y-z plane is orthogonal to said x-y plane; and a fourth cup support connected a fourth rail, wherein said fourth cup support only moves along said y-z plane of said housing.

12. The apparatus of claim 1, wherein said housing further includes a first door and a second door.

13. The apparatus of claim 12, wherein said first set of beverage pick-up windows is located on said first door, and said second set of beverage pick-up windows is located on said second door.

14. The apparatus of claim 12, wherein said first conveyer is attached to the back side of first front door, and said second conveyer is attached to the back side of second front door.

15. The apparatus of claim 1, further comprising at least one laser engraver for engraving a marking information about said beverage ordered by said customer directly on said cup when said cup is being filled with beverage.

16. The apparatus of claim 15, wherein said at least one laser engraver is protected by a splash guard that is cleaned by an air curtain.

17. The apparatus of claim 15, wherein said marking information is a barcode.

18. The apparatus of claim 1, wherein said housing further includes a self-cleaning subsystem for automatically cleaning a plurality of milk lines located between a milk dispenser and a diverter without human intervention.

19. The apparatus of claim 18, wherein said self-cleaning subsystem automatically cleans said milk lines between a depleted reservoir and a valve for said depleted reservoir without human intervention.

20. The apparatus of claim 7, wherein said first order progress screen is located on a first door, and said second order progress screen is located on a second door.

\* \* \* \* \*